No. 712,698. Patented Nov. 4, 1902.
J. W. MASTER.
BICYCLE.
(Application filed May 15, 1902.)
(No Model.)

WITNESSES.
Chas. K. Davies.
E. C. Carrick.

INVENTOR.
James W. Master
By Fenelon D. Brock
Attorney.

THE NORRIS PETERS CO., PHOTO-LITHO., WASHINGTON, D. C.

UNITED STATES PATENT OFFICE.

JAMES WILLIAM MASTER, OF SAN DIEGO, CALIFORNIA, ASSIGNOR OF ONE-HALF TO CHARLES B. RICHARDS, OF SAN DIEGO, CALIFORNIA.

BICYCLE.

SPECIFICATION forming part of Letters Patent No. 712,698, dated November 4, 1902.

Application filed May 15, 1902. Serial No. 107,494. (No model.)

*To all whom it may concern:*

Be it known that I, JAMES WILLIAM MASTER, of San Diego, county of San Diego, and State of California, have invented certain new and useful Improvements in Bicycles; and I do hereby declare the following to be a full and clear description thereof.

My invention relates to vehicles.

The object of my invention is to provide a rotary side-shaft driving mechanism with a variable-speed device, and in the present instance I have applied my improvements to what are termed in the trade "chainless bicycles." It is obvious, however, that my invention may be applied to any kind of a vehicle or velocipede for which it may be found suitable.

For the above purpose my invention consists in the following construction and combination of parts, the details of which will first be fully described and the features of novelty then set forth and claimed.

Figure 1:
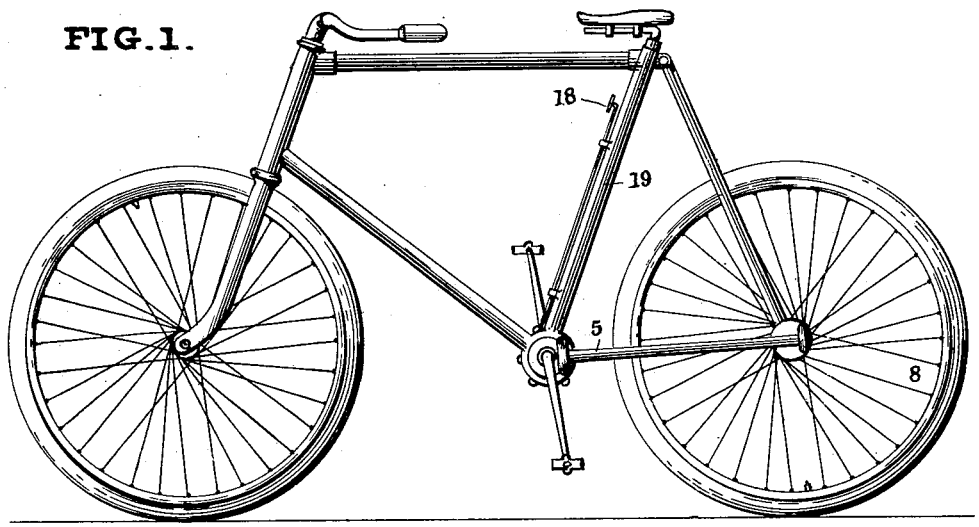
Figure 2:
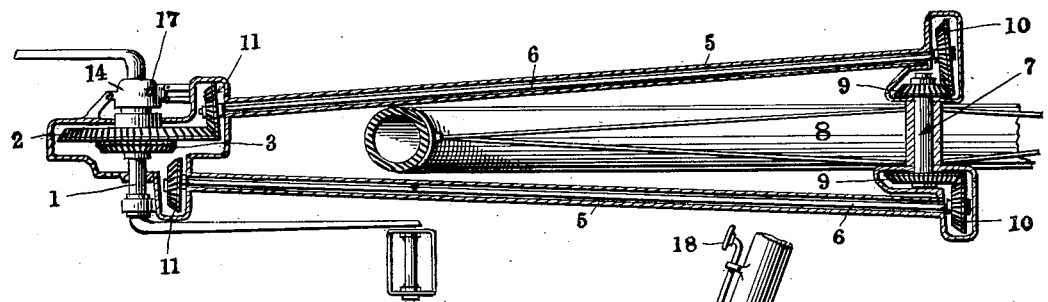
Figure 3:
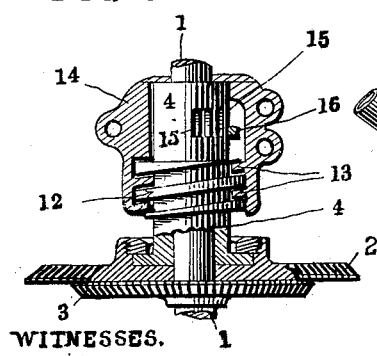
Figure 4:
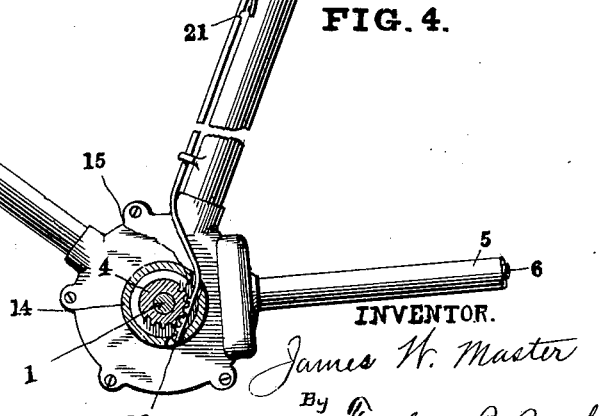

Figure 1 is a side elevation of a bicycle embodying my invention. Fig. 2 is a horizontal longitudinal section, on an enlarged scale, from the crank-shaft to the rear-wheel axle. Fig. 3 is a horizontal section of a detail of the crank-shaft. Fig. 4 is a side elevation of parts of the frame and partial transverse section of the crank-shaft.

In the drawings is shown a diamond-frame bicycle of the chainless type with rotary side impelling-shafts. The crank-shaft 1 is provided with differential bevel-gears 2 3. These gears are preferably carried upon a sleeve 4, which is splined to the shaft 1, so as to have a sliding reciprocating movement upon the shaft. I provide the rear horizontal fork 5 with a rotatable side shaft 6 in each tube of the fork. The rear shaft 7 carries upon either side of the rear wheel 8 differential bevel-gears 9. These gears 9 mesh with the differential gears 10, carried by the rotatable side shafts 6. The forward ends of the side shafts 6 are each provided with a bevel-gear 11, arranged to alternately mesh with the differential gears 2 3. The crank-shaft sleeve 4 carries a thread or worm 12, which is adapted to engage a similar interior thread or worm 13, provided in the forged or cast box or bearing 14. This sleeve 4 is provided with a geared sector 15, which is engaged by a rack 16. This rack is provided with an elongated extension-bar 17, having a handle 18 for the purpose of rotating or oscillating the sleeve 4 alternately in either direction. This bar 17 is shown extending up through and mortised in the bearing 14 outside the seat-post tube 19. It may, however, pass up through the seat-post, and the handle 18 may project therefrom in any way, so as to be conveniently operated by the rider. 20 is a spring device adapted to normally rest in a notch 21 on the rod 17 for the purpose of holding the rod in position after the sleeve 4 has been adjusted. By moving the rack-bar in one direction the sleeve 4 is moved to the right through the threaded connection 12 and 13 and the gear 2 is thrown into mesh with the gear 11 of the right-hand rotatable shaft 6. This adjustment is suitable for speed on level roads or downgrade. By moving the rack 16 in the opposite direction the threads 12 and 13 throw the differential gears 2 3 toward the left side of the frame and cause the gear 3 to mesh with the gear 11 of the left-hand shaft 6, thereby varying the speed to what is known as a "low gear," suitable for hill-climbing and the like.

It will be understood that the proportions of the gears shown in this instance are merely illustrative and that any suitable and practical relative proportions may be employed. The sector-gear 15 is shown elongated in Fig. 3 to permit it to slide along the rack-bar 16 during the change of speed from a high to a low gear.

The bicycle may be provided with dust-proof casings of any type, one form being shown in the drawings. The wheel is to be provided with the usual ball-bearings and other appurtenances usually carried by a first-class machine.

What I claim as new, and desire to secure by Letters Patent, is—

In a bicycle, or a like vehicle, the combination of a drive-wheel, differential gears carried upon each side of the drive-wheel, a rotatable side shaft upon each side of the drive-wheel, differential gears carried upon both ends of the rotatable side shafts, a crankshaft, a sleeve carrying differential gears adapted to alternately engage the gears of both rotatable side shafts, a gear connection between the sleeve and the bearings for reciprocating the differential gears, bearings in which the sleeve reciprocates, a sector carried by the reciprocating sleeve, a rack engaging the sector on the sleeve, and a rod connecting with the rack for alternately oscillating the sleeve and changing the speed of the gears.

In testimony whereof I have affixed my signature in the presence of two witnesses.

JAMES WILLIAM MASTER.

Witnesses:
W. A. SLOANE,
M. A. LUCE.